(12) United States Patent
van Steijn et al.

(10) Patent No.: US 12,733,652 B2
(45) Date of Patent: Sep. 15, 2026

(54) SYSTEM FOR HANGING POULTRY

(71) Applicant: Meyn Food Processing Technology B.V., Oostzaan (NL)

(72) Inventors: Aloysius Christianus Maria van Steijn, Oostzaan (NL); Rick Sebastiaan van Stralen, Oostzaan (NL); Gert Jan Al, Oostzaan (NL); Joy David Mike van Spall, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 19/080,300

(22) Filed: Mar. 14, 2025

(65) Prior Publication Data

US 2025/0287962 A1 Sep. 18, 2025

(30) Foreign Application Priority Data

Mar. 15, 2024 (NL) .................................... 2037258

(51) Int. Cl.
*A22C 21/00* (2006.01)

(52) U.S. Cl.
CPC ...... *A22C 21/0053* (2013.01); *A22C 21/0007* (2013.01)

(58) Field of Classification Search
CPC ........... A22C 21/0053; A22C 21/0007; A22C 21/0038; A22C 21/0046
USPC ................................................ 452/182, 187
See application file for complete search history.

(56) References Cited

U.S. PATENT DOCUMENTS

| | | | | |
|---|---|---|---|---|
| 4,178,659 A * | 12/1979 | Simonds | A22C 21/0053 198/486.1 |
| 5,453,045 A * | 9/1995 | Hobbel | A22C 21/0053 452/183 |
| 9,179,684 B2 | 11/2015 | van Stuyvenberg | |
| 12,356,998 B2 * | 7/2025 | Van Der End | A22C 21/0046 |
| 2016/0021902 A1 * | 1/2016 | Winkelmolen | A22C 21/06 452/183 |

FOREIGN PATENT DOCUMENTS

| | | |
|---|---|---|
| CN | 113543644 A | 10/2021 |
| CN | 116918852 A | 10/2023 |
| EP | 4 275 507 A1 | 11/2023 |

OTHER PUBLICATIONS

NL Search Report, Mar. 15, 2024.
Co-Pending U.S. Appl. No. 18/889,806, filed Sep. 19, 2024.
Chinese Office Action with Translation, Apr. 27, 2026.

* cited by examiner

*Primary Examiner* — Richard T Price, Jr.
(74) *Attorney, Agent, or Firm* — Dority & Manning, P.A.

(57) ABSTRACT

A system for hanging poultry by the legs and feet in a shackle of a conveyor line. A supply line with at least one first carrier for the poultry. A movable take over device can receive the legs of the poultry and transfers the poultry from the at least one first carrier to the shackle in the conveyor line at a transfer location. The shackle, the movable take over device, and the at least one first carrier can be aligned. The movable take over device can be arranged to engage the legs of the poultry at the transfer location, move the feet above the shackle, move the feet downwards into the shackle, and disengage the legs. Pushing equipment pushes the poultry from the at least one first carrier to the movable take over device when the poultry is at the transfer location.

12 Claims, 9 Drawing Sheets

14
14
10
10
8

SYSTEM FOR HANGING POULTRY

PRIORITY STATEMENT

The present application claims priority under 35 U.S.C § 119 to Dutch Patent Application No. 2037258, filed on Mar. 15, 2024.

FIELD OF THE INVENTION

In general, the present disclosure relates to a poultry hanging system, poultry conveying line, and method of hanging poultry.

BACKGROUND OF THE INVENTION

EP-A-4 275 507 describes a system, wherein during the operation for rehanging the poultry, the poultry is suspended both by the legs and by the head. This leads to a relatively complicated system, wherein while the poultry is suspended by the head, the movable take over device engages the legs so as to move these legs towards the shackle of the conveyor line.

U.S. Pat. No. 5,453,045 describes a system for transferring birds from a weigh line to a cut-up line through an intermediate accumulator. The system includes a continuously rotating buffer wheel having a plurality of bird carriers slidably mounted on its periphery and being carried on the buffer wheel toward either an inlet gate or a delivery gate. When a bird carrier arrives at either an inlet gate or a delivery gate, it is stopped by a gate arm, and remains stationary with respect to the continuously moving buffer wheel. When a bird moves along the weigh line toward the buffer wheel, gate arm opens and a first pressure wheel assembly is activated to carry a bird carrier on the periphery of the buffer wheel toward a shackle having the bird suspended therefrom, to the inlet area whereupon the bird will be transferred from the shackle to the bird carrier, and then be carried on the buffer wheel toward delivery gate. Thereafter, when an empty shackle on cut-up line approaches delivery area, the gate arm is opened and a second pressure wheel assembly is activated to carry a bird carrier having a bird suspended therefrom move into the delivery area so that the bird carried on the bird carrier plate will be transferred to a shackle of the cut-up line.

BRIEF DESCRIPTION OF THE INVENTION

Aspects and advantages of the invention will be set forth in part in the following description, or may be obvious from the description, or may be learned through practice of the invention.

In one exemplary aspect, it is an object of the present subject matter to simplify the known procedure and to make a system for eventually suspending the poultry by the feet more simple than the prior art system. This will improve the reliability of operation of the system. Further aspects and advantages of the present subject matter will become apparent from the following disclosure.

In another exemplary aspect, the present subject matter relates to a system for hanging poultry by the feet in a shackle of a conveyor line. The system can include a supply line with at least one first carrier for the poultry, a movable take over device for receiving the legs of the poultry and for transfer of the poultry from the at least one first carrier of the supply line to the shackle in the conveyor line at a transfer location. The movable take over device and the at least one first carrier of the supply line can be aligned. The movable take over device can be arranged to engage the legs of the poultry at the transfer location so as to move the feet above the shackle and then downwards to provide the feet into the shackle, after which the movable take over device disengages the poultry legs. The system for hanging poultry can be provided with the features of one or more of the appended claims.

In another exemplary aspect of the present subject matter, the system can include a pushing equipment for pushing the poultry from the at least one first carrier of the supply line to the movable take over device when the poultry is at the transfer location. The system can thus be simplified considerably, and this can be accomplished with relatively simple means embodied by the pushing equipment which avoids the need of the prior art system to simultaneously suspend the poultry by the head and by the legs while the legs are transferred to the shackle. To ensure a reliable and accurately attuned transfer of the poultry, the movable take over device can be separate from the supply line and can be mounted on a carrousel along which the conveyor line with the receiving shackle can be guided.

In another exemplary aspect, the pushing equipment may be fixed in the system. The at least one first carrier of the supply line may include the pushing equipment. This secures that the pushing equipment can be automatically synchronized with the movement of the at least one first carrier.

In another exemplary aspect, as a relatively simple way of embodying the pushing equipment, the pushing equipment may include a push bar.

In another exemplary aspect, the movable take over device can include a locking element or elements to trap the poultry legs after they are received in the movable transfer device. This feature can be helpful when moving the feet from above the shackle downwards into the shackle whereafter the movable take over device can disengage the poultry legs. The locking element or elements can be arranged to release the poultry legs when the feet are moved into the shackle of the conveyor line.

In another exemplary aspect, the system of the present subject matter can be applied with additional features to feed poultry into the at least first carrier, such as for example hanging systems as described in NL2035845. An application of the system can be when the system includes an infeed conveyor and at least one robot for picking up the poultry from the infeed conveyor and suspending the poultry into the at least one first carrier of the supply line. The robot may pick up the poultry from the head or from the legs or feet.

In one exemplary embodiment, the at least one robot can be equipped for picking up the poultry from the feedline and keeping the poultry suspended by the head while the robot moves the poultry legs into the at least one first carrier of the supply line.

In another exemplary embodiment, a part of the at least one first carrier can be rotatable around a horizontal axis to enable flipping of the poultry from its position suspended by the head to a position suspended by the legs. This supports an effective and controlled manner of converting the poultry from a position suspended by the head to a position suspended by the legs.

In another exemplary aspect, the back of the poultry faces the at least one first carrier of the supply line when the poultry may be suspended by the legs. This can be helpful for accommodating the later transfer of the poultry to the shackle in the conveyor line.

In another exemplary aspect, the at least one robot has resilient engagement flaps to reduce relative movement of the poultry with respect to the robot.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The accompanying drawings, which are incorporated into and forms a part of the specification, illustrate one or more exemplary embodiments of the present invention and, together with the description, serves to explain the principles of the invention. The drawings are only for the purpose of illustrating one or more embodiments of the invention and is not to be construed as limiting the invention.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

FIGS. 1, 2, 3, and 4 show (parts of) an exemplary system 1 for hanging poultry 2 by the legs 3 and feet 3' in a shackle 4 of a conveyor line 5.

Figure 1:
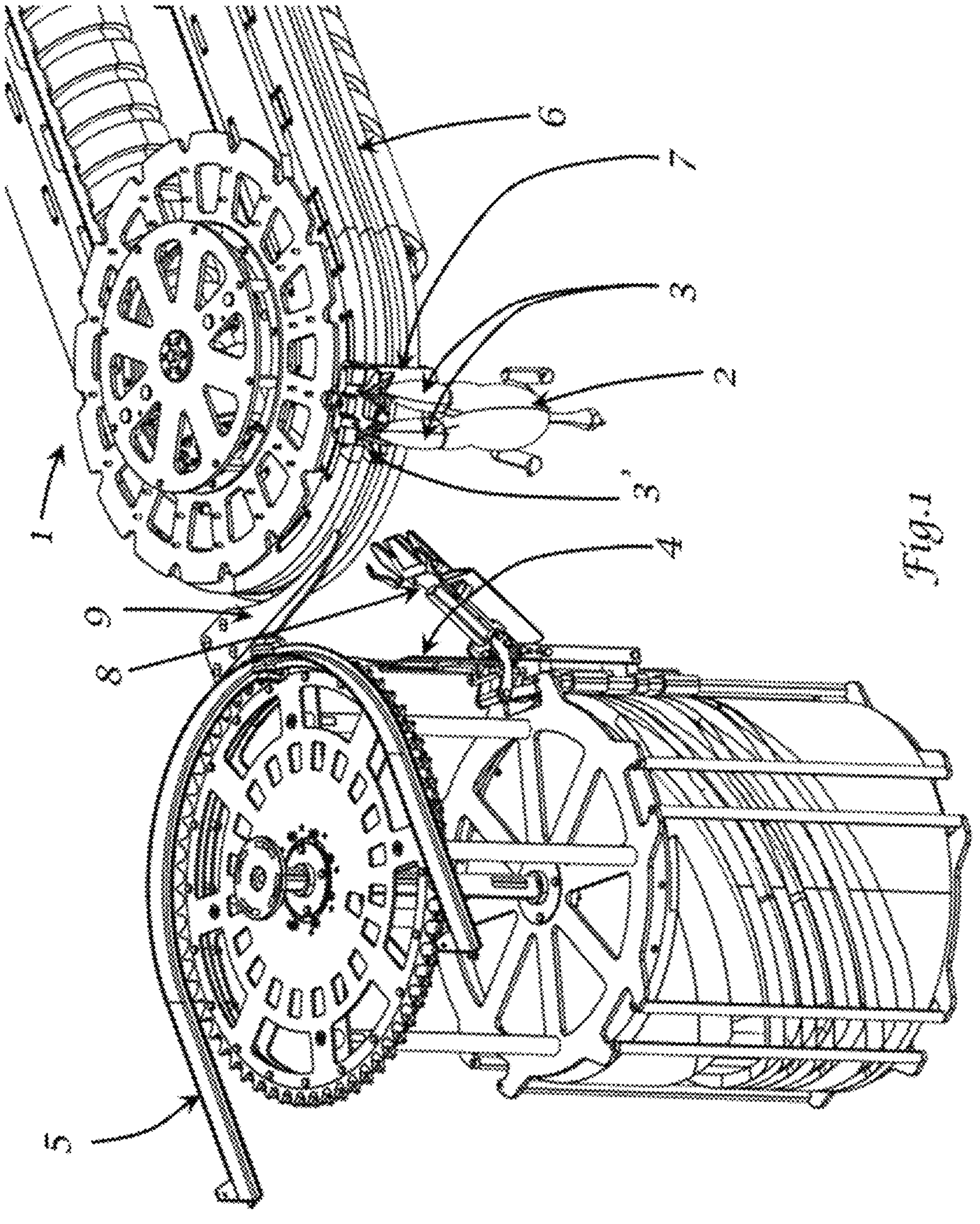
FIGS. 1, 2, 3, and 4 depict an exemplary system of the present subject matter for suspending poultry by the legs in a shackle of a conveyor line.
Figure 2:
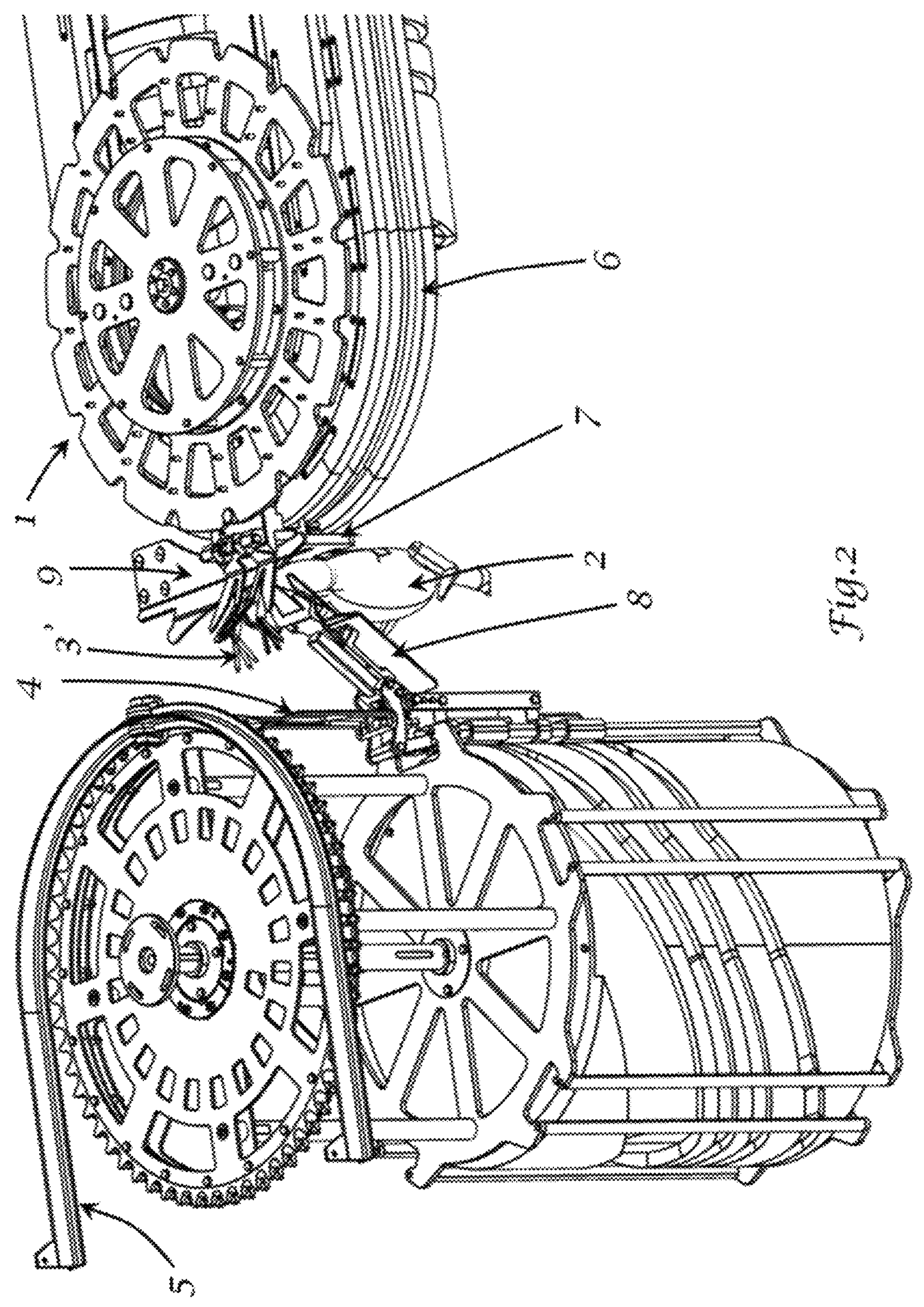

FIGS. 1 and 2 show that the system 1 includes a supply line 6 with at least one first carrier 7 for the poultry 2, a movable take over device 8 for receiving the legs 3 of the poultry 2 and for transfer of the poultry 2 from the at least one first carrier 7 of the supply line 6 to the shackle 4 in the conveyor line 5. As shown in the figures and within the scope of the present subject matter the first carrier 7 for the poultry 2 carries the poultry preferably suspended by the hocks.

Transfer of the poultry from the at least one first carrier 7 of the supply line 6 to the shackle 4 in the conveyor line 5 occurs at a transfer location wherein the movable take over device 8, and the at least one first carrier 7 of the supply line 6 may be aligned as shown in FIG. 2. As depicted in FIGS. 1, 2, 3, and 4, the movable take over device 8 may be separate from the supply line 6 and mounted on a carrousel along which the conveyor line 5 with the receiving shackle 4 may be guided.

Figure 3:
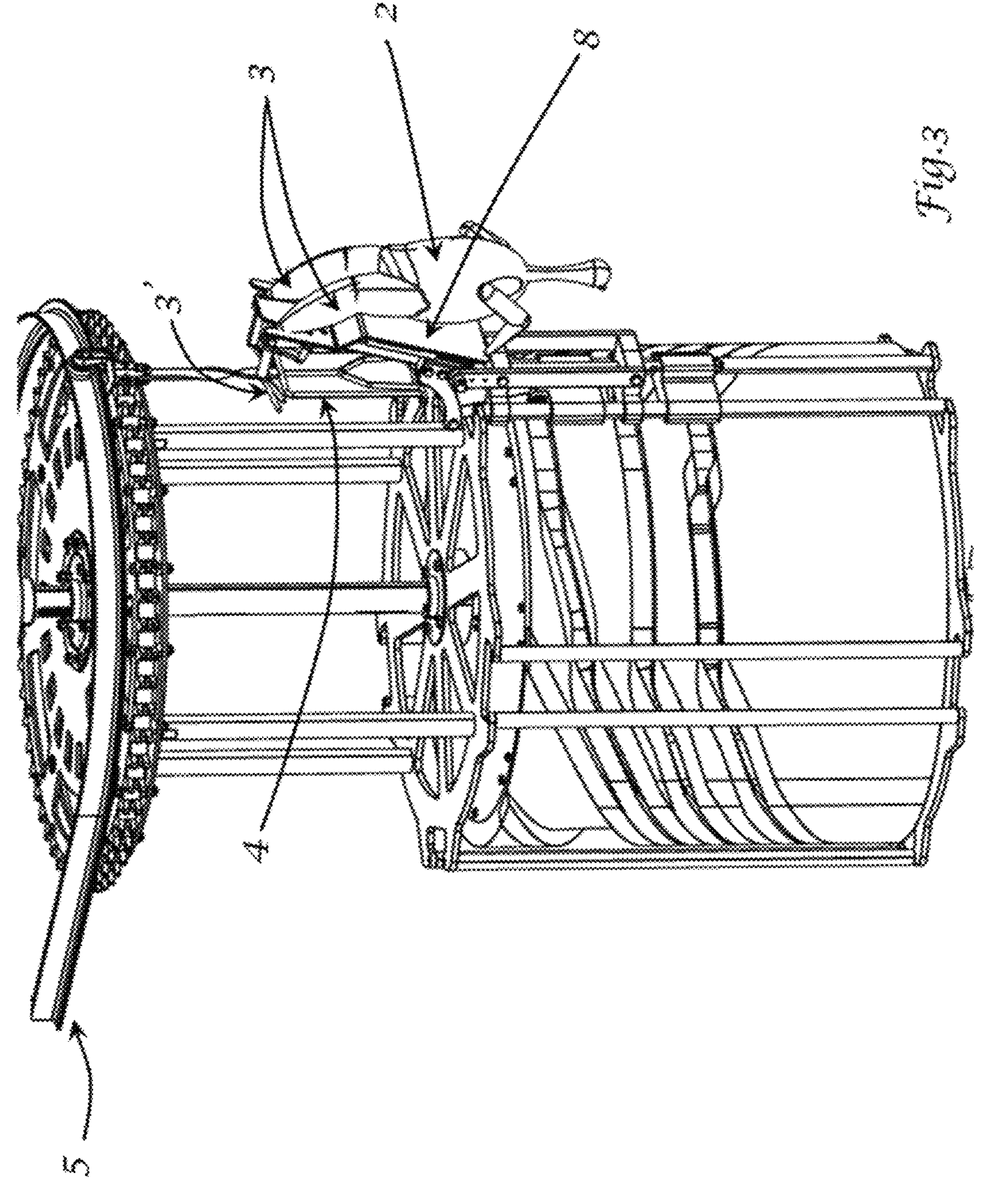
Figure 4:
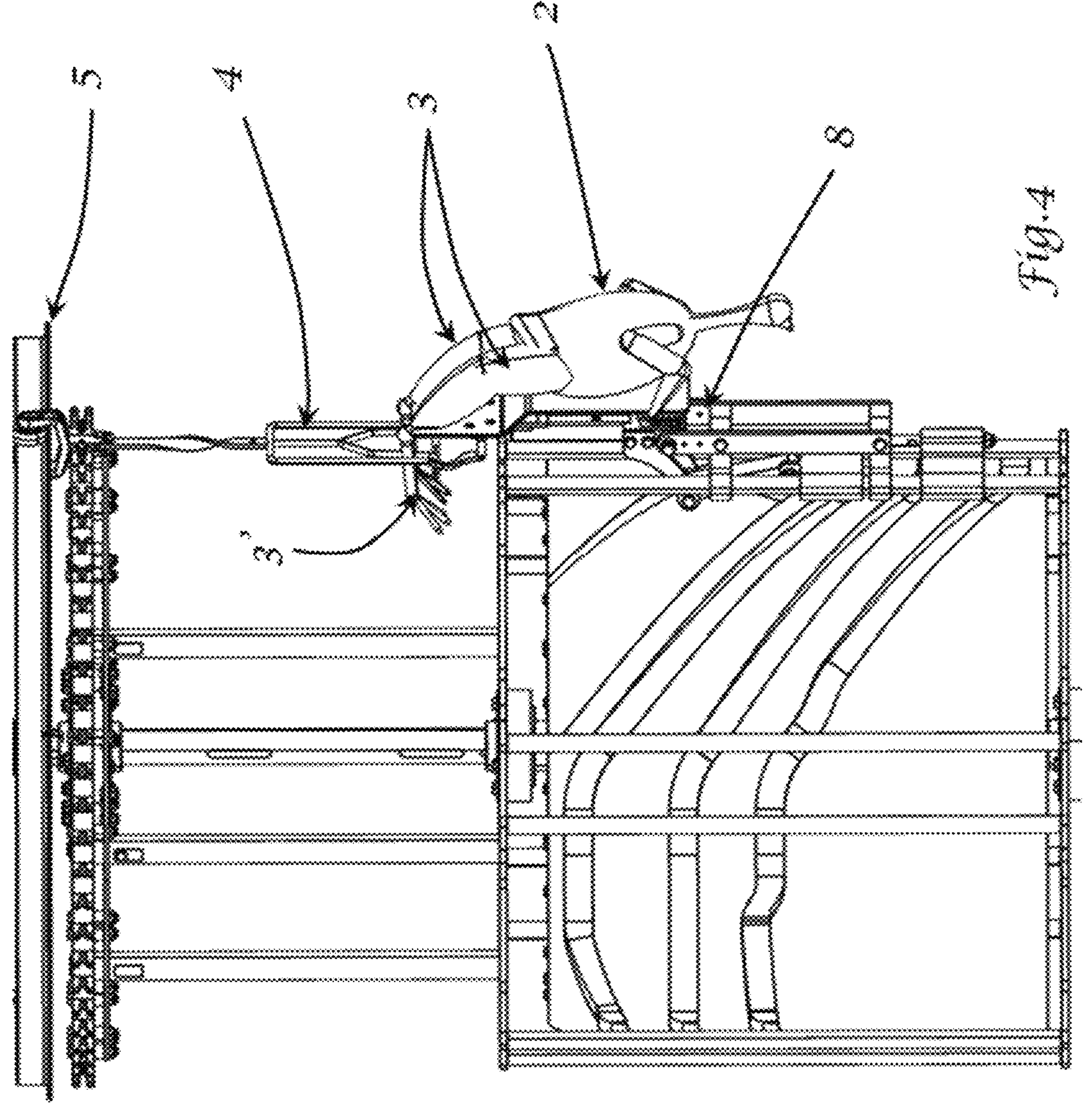

The movable take over device 8 may be arranged to engage the legs 3 of the poultry 2 at the transfer location so as to move the feet 3' first to a position above the shackle 4 as shown in FIG. 3, and then move the legs 3 subsequently downwards and towards the shackle 4 as depicted in FIG. 4. Once the feet 3' and legs 3 are brought in position with reference to the shackle 4 as shown in FIG. 4, the movable take over device 8 disengages the poultry legs 3 so that the poultry may be entirely suspended by the feet 3' from the shackle 4. This may be depicted in FIG. 4.

To support the transfer of the poultry 2 from the at least one first carrier 7 of the supply line 6 to the shackle 4 in the conveyor line 5, the motion of the legs 3 and feet 3' may be predominantly defined by the movable take over device 8. In connection therewith the system 1 may further include pushing equipment 9 for pushing the poultry from the at least one first carrier 7 of the supply line 6 to the movable take over device 8 when the poultry 2 may be at the transfer location shown in FIG. 2. In an exemplary aspect, preferably this pushing equipment 9 may include a push bar.

Figure 5:
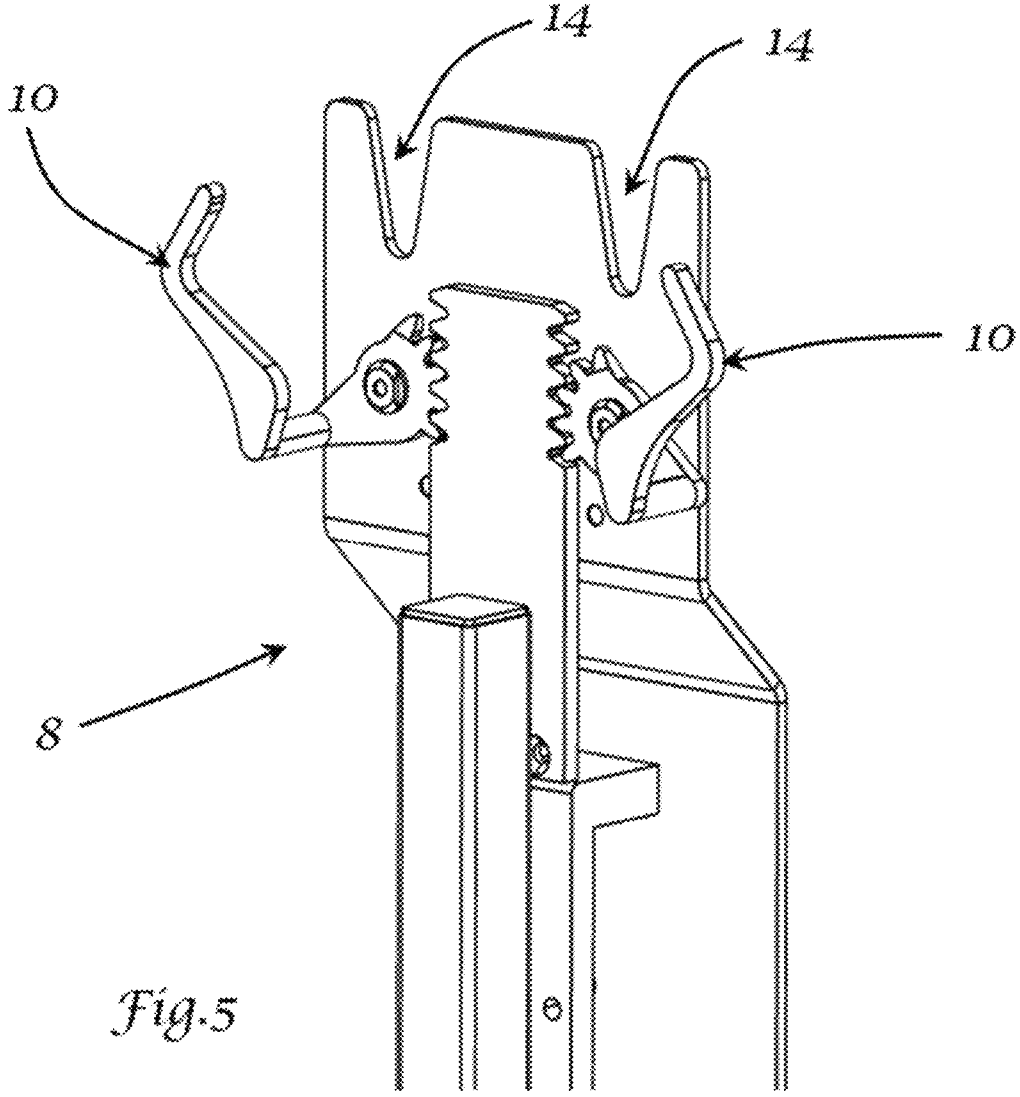
FIG. 5 shows an exemplary movable take over device of the exemplary system of FIGS. 1, 2, 3, and 4.

To secure the handling of the legs 3 and the feet 3' of the poultry 2 by the movable take over device 8, the device 8 may include a locking element or elements 10 to trap the poultry legs 3 after they are received in closable slits 14 of the movable transfer device 8. This may be shown in FIG. 5. This feature may be particularly helpful when after the movable transfer unit 8 has first moved the feet 3' above the shackle 4 as shown in FIG. 3, the legs 3 of the poultry 2 are subsequently moved downwards, towards and into the shackle 4 as depicted in FIG. 4, such that during this movement the fingers of the feet are pushed against the top side of the shackle 4.

When the legs 3 are in the shackle 4 as depicted in FIG. 4, the locking element or elements 10 may be arranged to release the poultry legs 3.

Figure 6:
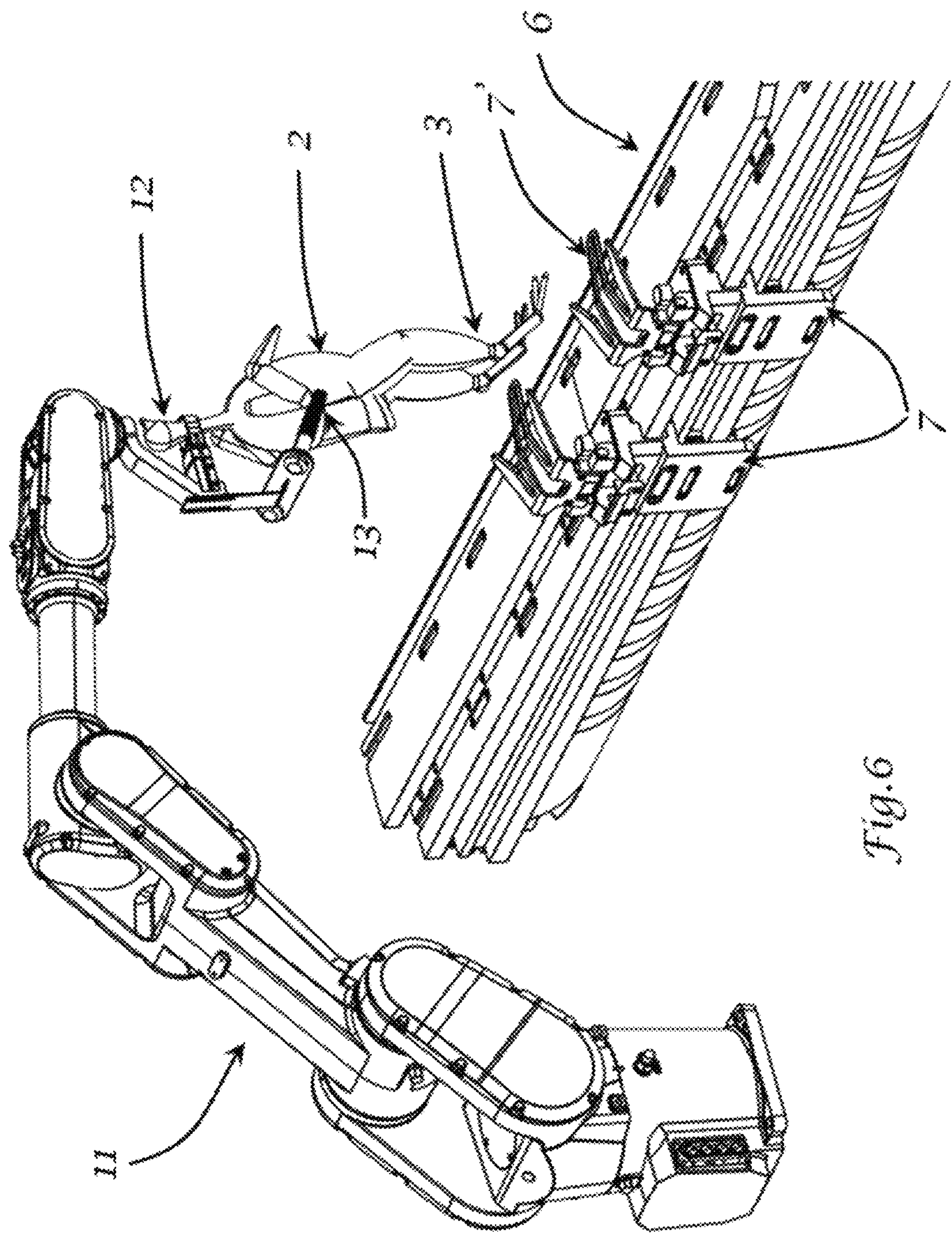
FIGS. 6, 7, 8, and 9 depict the operations of an exemplary robot for suspending the poultry by the legs in a carrier of a supply line that precedes the conveyor line with shackles as shown in FIGS. 1-4.
Figure 7:
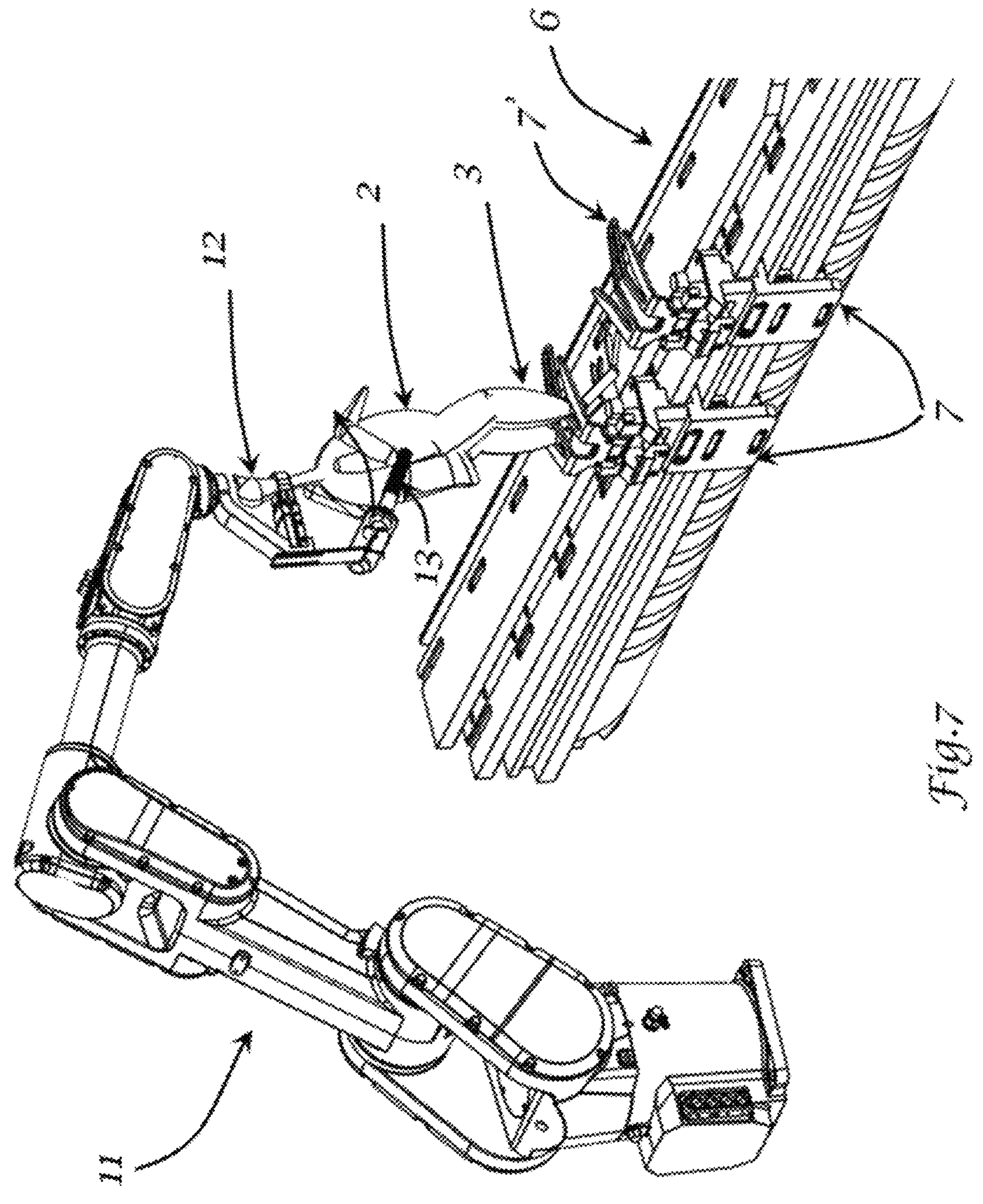

Turning now to FIG. 6, another exemplary aspect of the present subject may be highlighted, wherein the system may include an infeed conveyor (not shown) and at least one robot 11 for picking up the poultry 2 from the infeed conveyor. The robot 11 may be arranged to first suspend the poultry 2 by the head 12 as shown in FIGS. 6 and 7. After that in a series of operations the poultry 2 may be eventually suspended by the legs 3 in the at least one first carrier 7 of the supply line 6.

In a first step of the series of operations the at least one robot 11 may be equipped for initially keeping the poultry 2 suspended by the head 12 while moving the poultry legs 3 into the at least one first carrier 7 of the supply line 6, with the poultry being heads-up. This operation may be completed in FIG. 7.

Figure 8:
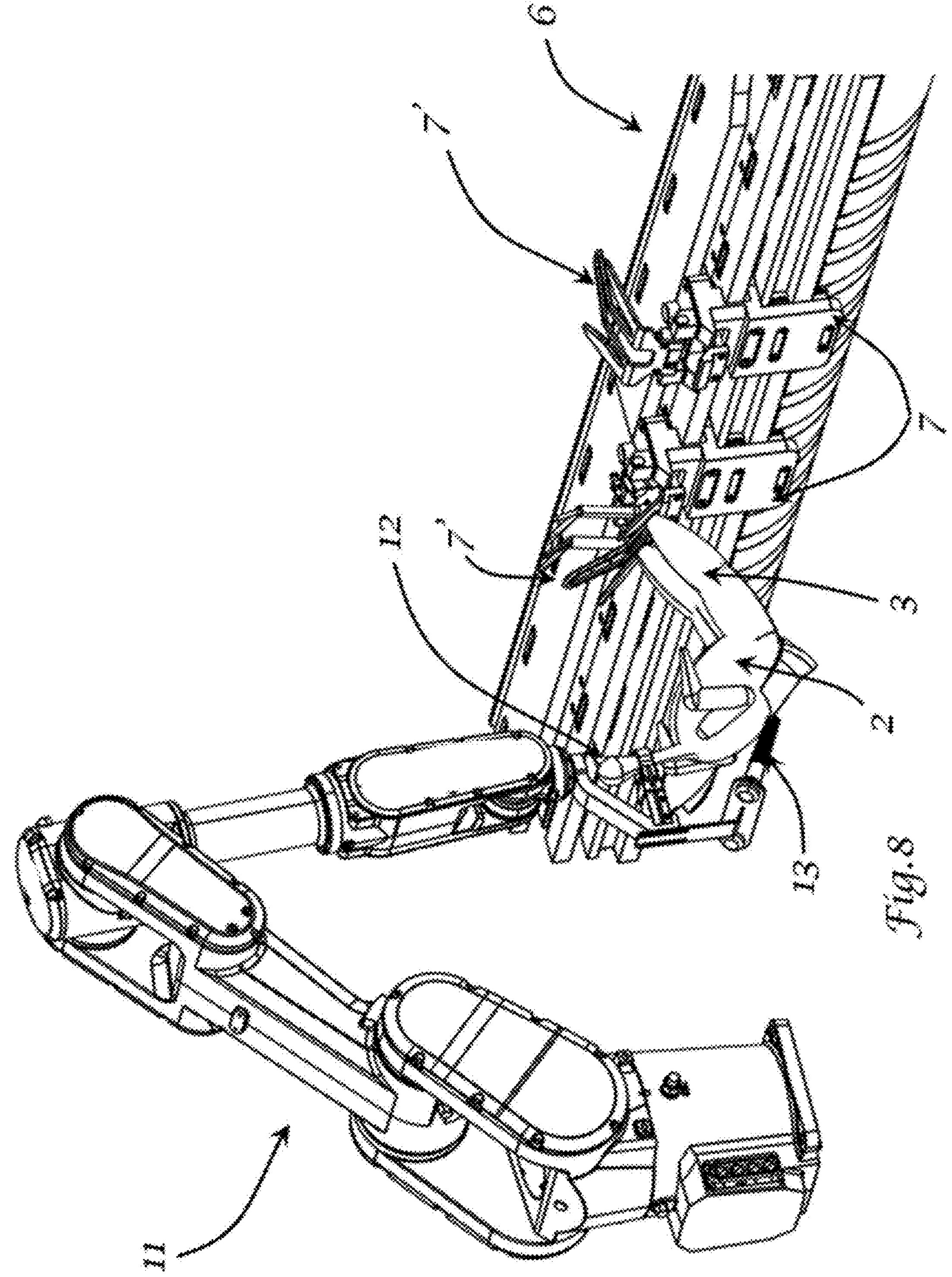
Figure 9:
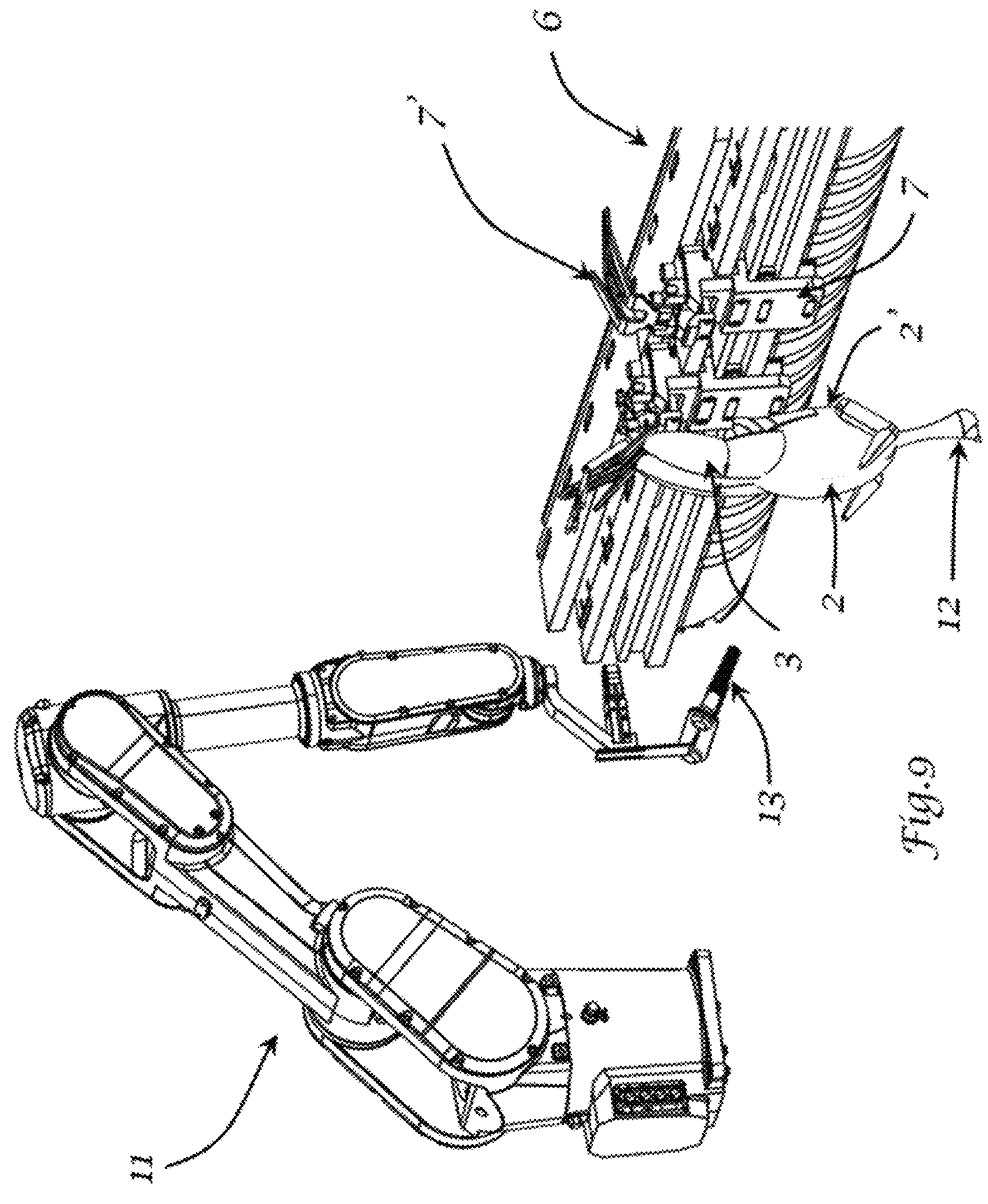

FIG. 8 depicts that a part 7' of the at least one first carrier 7 that engages the legs 3 of the poultry 2 may be rotatable around a horizontal axis to enable flipping of the poultry 2 from its position suspended by the head 12 to a position suspended by the legs 3, as shown in FIG. 9.

It shows in FIG. 9 that the back 2' of the poultry 2 faces the at least one first carrier 7 of the supply line 6 when the poultry 2 may be suspended by the legs 3.

FIG. 6 and FIG. 7 show that the at least one robot 11 has engagement flaps 13 made of a resilient material such as rubber or polymer to reduce relative movement of the poultry 2 with respect to the robot 11 as the poultry 2 may be being picked up and moved by the robot 11.

Although the invention has been discussed in the foregoing with reference to an exemplary embodiment of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claim to this exemplary embodiment. The scope of protection of the invention shall therefore be construed in accordance with the appended claims only, wherein a possible ambiguity in the wording of the claims shall be resolved using this exemplary embodiment.

Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. A system for hanging poultry by the feet in a shackle of a conveyor line comprising:

a supply line with at least one first carrier for carrying the poultry while being suspended from the legs;

pushing equipment for pushing the poultry from the at least one first carrier of the supply line; and a movable take over device for receiving the legs of the poultry and for transferring the poultry from the at least one first carrier of the supply line to the shackle in the conveyor line at a transfer location, wherein the movable take over device and the at least one first carrier of the supply line are aligned, wherein the movable take over device is arranged to engage the legs of the poultry at the transfer location so as to move the feet above the shackle and then downwards to provide the feet into the shackle, after which the movable take over device disengages the poultry legs.

2. The system of claim 1, wherein the at least one first carrier of the supply line comprises the pushing equipment.

3. The system of claim 1, wherein the pushing equipment comprises a push bar.

4. The system of claim 1, wherein the movable take over device comprises a locking element or elements to trap the poultry legs after they are received in the movable transfer device.

5. The system of claim 4, wherein the locking element or elements are arranged to release the poultry legs when the feet are moved into the shackle of the conveyor line.

6. The system of claim 1, wherein the system comprises an infeed conveyor and at least one robot for picking up the poultry from the infeed conveyor and suspending the poultry into the at least one first carrier of the supply line.

7. The system of claim 6, wherein the at least one robot is equipped for picking up the poultry from the infeed conveyor and keeping the poultry suspended by the head while moving the poultry legs into the at least one first carrier of the supply line.

8. The system of claim 7, wherein at least a part of the at least one first carrier is rotatable around a horizontal axis to enable flipping of the poultry from its position suspended by the head to a position suspended by the legs.

9. The system of claim 8, wherein the back of the poultry faces the at least one first carrier of the supply line when the poultry is suspended by the legs.

10. The system of claim 6, wherein the at least one robot has at least a flap arranged to get in contact with the poultry while being picked up by the robot and to reduce relative movement of the poultry with respect to the robot.

11. The system of claim 10, wherein the at least one flap is resilient.

12. The system of claim 1, wherein in the supply line the poultry is suspended from the first carrier by the hocks.

* * * * *